United States Patent
Ritschel et al.

(10) Patent No.: US 10,202,669 B2
(45) Date of Patent: Feb. 12, 2019

(54) PROCESS FOR THE PRODUCTION OF A PGM-ENRICHED ALLOY

(71) Applicants: Heraeus Deutschland GmbH & Co. KG, Hanau (DE); Heraeus Precious Metals North America LLC, Santa Fe Springs, CA (US)

(72) Inventors: Norbert Ritschel, Robbins, TN (US); Jimmy Taylor, Sunbright, TN (US); Todd England, Sunbright, TN (US); Brian Peters, Wartburg, TN (US); Felix Stoffner, Aschaffenburg (DE); Christoph Röhlich, Hanau (DE); Steffen Voss, Limeshain (DE); Holger Winkler, Darmstadt (DE)

(73) Assignees: Heraeus Deutschland GmbH & Co. KG, Hanau (DE); Heraeus Precious Metals North America LLC, Santa Fe Springs, CA (US)

( * ) Notice: Subject to any disclaimer, the term of this patent is extended or adjusted under 35 U.S.C. 154(b) by 264 days.

(21) Appl. No.: 15/197,102

(22) Filed: Jun. 29, 2016

(65) Prior Publication Data

US 2017/0002441 A1 Jan. 5, 2017

(51) Int. Cl.
| | | |
|---|---|---|
| C22B 23/06 | (2006.01) | |
| C22B 9/00 | (2006.01) | |
| C22B 11/02 | (2006.01) | |

(52) U.S. Cl.
CPC ............... *C22B 23/06* (2013.01); *C22B 9/00* (2013.01); *C22B 11/02* (2013.01); *C22B 11/026* (2013.01); *Y02P 10/214* (2015.11)

(58) Field of Classification Search
CPC    C22B 23/06; C22B 9/00; C22B 11/02; C22B 11/023; Y02P 10/214
USPC .................................................. 75/628; 420/8
See application file for complete search history.

(56) References Cited

U.S. PATENT DOCUMENTS

| | | | |
|---|---|---|---|
| 4,428,768 A | 1/1984 | Day | |
| 2011/0274580 A1* | 11/2011 | Deegan | C22B 4/005 |
| | | | 420/591 |
| 2014/0053687 A1* | 2/2014 | Nakamura | C22B 11/021 |
| | | | 75/631 |
| 2014/0150608 A1* | 6/2014 | Nakamura | C22B 11/021 |
| | | | 75/632 |
| 2018/0142327 A1* | 5/2018 | Stoffner | C22C 19/03 |
| 2018/0142328 A1* | 5/2018 | Stoffner | C22C 19/03 |
| 2018/0142329 A1* | 5/2018 | Stoffner | C22C 19/03 |
| 2018/0142330 A1* | 5/2018 | Stoffner | C22C 19/03 |

FOREIGN PATENT DOCUMENTS

| | | | | |
|---|---|---|---|---|
| CN | 102388154 A | | 3/2012 | |
| CN | 10 3328662 | * | 9/2013 | ............. B01J 23/42 |
| CN | 103328662 A | | 9/2013 | |
| CN | 10 4178634 | * | 12/2014 | ............. C22B 11/00 |
| CN | 104178634 A | | 12/2014 | |
| CN | 10 4372173 | * | 2/2015 | ............. C22B 11/00 |
| CN | 104372173 A | | 2/2015 | |
| EP | 0512959 A2 | | 11/1992 | |
| EP | 2666876 A1 | | 11/2013 | |
| GB | 2086941 A | | 5/1982 | |
| JP | H06228671 A | | 8/1994 | |
| JP | 2004-277792 | * | 10/2004 | ............. C22B 11/02 |
| JP | 2004277792 A | | 10/2004 | |
| JP | 2005-113193 | * | 4/2005 | ............. C22B 11/02 |
| JP | 2005113193 A | | 4/2005 | |
| RU | 2360984 C1 | | 7/2009 | |

OTHER PUBLICATIONS

McCullough et al. Pyrometallurgical iron removal from a PGM-containing alloy, Third International Platinum Conference 'Platinum in Transformation' The Southern African Inst of Mining & Metallurgy, pp. 1-8, 2008.
Int'l Search Report and Written Opinion dated Jul. 4, 2016 in Int'l Application No. PCT/EP2016/059154.
Office Action dated May 29, 2018 in CN Application No. 201680002835.8.

* cited by examiner

*Primary Examiner* — Patricia L. Hailey
(74) *Attorney, Agent, or Firm* — Panitch Schwarze Belisario & Nadel LLP

(57) ABSTRACT

A process for production of a PGM (platinum group metal)-enriched alloy containing iron and PGM(s) (platinum, palladium and/or rhodium) includes steps of: (1) providing a sulfur-free PGM collector alloy, (2) providing a copper- and sulfur-free material capable of forming a molten slag-type composition including silicon dioxide and magnesium and/or calcium oxide, (3) melting the PGM collector alloy and slag-forming material within a converter until a multi-phase system of a lower high-density molten mass of PGM collector alloy and an upper low-density molten mass of slag-type composition has formed, (4) contacting an oxidizing gas with the lower high-density molten mass of step (3) until conversion of the PGM collector alloy into a PGM-enriched alloy, (5) separating an upper molten slag formed in step (4) from the PGM-enriched alloy by difference in density, (6) allowing the separated molten masses to cool down and solidify, and (7) collecting the solidified PGM-enriched alloy.

18 Claims, No Drawings

PROCESS FOR THE PRODUCTION OF A PGM-ENRICHED ALLOY

BACKGROUND OF THE INVENTION

The invention relates to a pyrometallurgical converting process for production of a PGM-enriched alloy and to the PGM-enriched alloy itself.

The abbreviation "PGM" used herein means platinum group metal.

In general, the enrichment of PGMs by pyrometallurgical converting is well-known, see, for example, S. D. McCullough, "Pyrometallurgical iron removal from a PGM-containing alloy," *Third International Platinum Conference 'Platinum in Transformation,*' pages 1-8, The Southern African Institute of Mining and Metallurgy (2008).

The invention is a pyrometallurgical converting process improved in terms of yielding a PGM-enriched alloy having a considerably high PGM level and exhibiting a remarkably low PGM loss into slag formed as by-product of the pyrometallurgical converting process.

BRIEF SUMMARY OF THE INVENTION

The process of the invention is a process for the production of a PGM-enriched alloy comprising 0 to 60 wt. % (weight percent) of iron and 20 to 99 wt. % of one or more PGMs selected from the group consisting of platinum, palladium and rhodium. The process comprises the following steps:

(1) providing a sulfur-free PGM collector alloy comprising 30 to 95 wt. % of iron and 2 to 15 wt. % of one or more PGMs selected from the group consisting of platinum, palladium and rhodium;

(2) providing a copper- and sulfur-free material capable of forming a slag-type composition when molten, wherein the molten slag-type composition comprises 10 to 30 wt. % of magnesium oxide and/or calcium oxide and 70 to 90 wt. % of silicon dioxide;

(3) melting the PGM collector alloy and the material capable of forming a slag-type composition when molten in a weight ratio of 1:0.75 to 5 within a converter until a multi- or two-phase system of a lower high-density molten mass comprising the molten PGM collector alloy and one or more upper low-density molten masses comprising the molten slag-type composition has formed;

(4) contacting an oxidizing gas comprising 0 to 80 vol. % (volume percent) of inert gas and 20 to 100 vol. % of oxygen with the lower high-density molten mass obtained in step (3) until it has been converted into a lower high-density molten mass of the PGM-enriched alloy (i.e., a lower high-density molten mass of the composition of the PGM-enriched alloy);

(5) separating an upper low-density molten slag formed in the course of step (4) from the lower high-density molten mass of the PGM-enriched alloy by making use of the difference in density;

(6) allowing the molten masses separated from one another to cool down and solidify; and (7) collecting the solidified PGM-enriched alloy.

Note: "0 wt. %" appears several times in the description and the claims; it means that the respective component is not present or, if present, it is present at most in a proportion of no more than a technically inevitable impurity level.

The process of the invention is a process for production of a PGM-enriched alloy comprising 0 to 60 wt. % of iron and 20 to 99 wt. % of one or more PGMs selected from the group consisting of platinum, palladium and rhodium. It is preferred that the PGM-enriched alloy produced by the process of the invention comprise 0 to 45 wt. % of iron and 30 to 99 wt. % of one or more of the PGMs, in particular 0 to 20 wt. % of iron and 40 to 90 wt. % of one or more of the PGMs. The PGM-enriched alloy made by the process of the invention may also comprise 0 to 60 wt. % of nickel and 0 to 5 wt. % of copper. Examples of other elements (elements other than iron, nickel, copper, platinum, palladium and rhodium) which may be comprised by the PGM-enriched alloy made by the process of the invention include, in particular, silver, gold, aluminum, calcium and silicon. The PGM-enriched alloy made by the process of the invention may comprise one or more of the other elements in a total proportion of up to 10 wt. %.

Hence, the PGM-enriched alloy made by the process of the invention may comprise or consist of:
- 0 to 60 wt. %, preferably 0 to 45 wt. %, in particular 0 to 20 wt. %, of iron;
- 20 to 99 wt. %, preferably 30 to 99 wt. %, in particular 40 to 90 wt. %, of one or more PGMs selected from the group consisting of platinum, palladium and rhodium;
- 0 to 60 wt. % of nickel;
- 0 to 5 wt. % of copper; and
- 0 to 10 wt. %, preferably 0 to 6 wt. %, in particular 0 to 3 wt. %, of one or more other elements, in particular one or more other elements selected from the group consisting of silver, gold, aluminum, calcium and silicon.

DETAILED DESCRIPTION OF THE INVENTION

In one embodiment, the PGM-enriched alloy made by the process of the invention comprises or consists of 0 to 20 wt. % of iron, 40 to 90 wt. % of one or more PGMs selected from the group consisting of platinum, palladium and rhodium, 0 to 60 wt. % of nickel, 0 to 5 wt. % of copper, and 0 to 3 wt. % of one or more other elements, in particular, one or more other elements selected from the group consisting of silver, gold, aluminum, calcium and silicon.

In step (1) of the process of the invention a sulfur-free PGM collector alloy (hereinafter also called "PGM collector alloy" for short) is provided.

The term "sulfur-free" used herein in the context of step (1) of the process of the invention means that the PGM collector alloy may comprise sulfur in a proportion of no more than a technically inevitable impurity level of, for example, less than 1000 wt.-ppm.

PGM collector alloys are well-known to the person skilled in the art; they may typically be formed during pyrometallurgic recycling of appropriate PGM containing waste material, for example PGM containing waste catalysts, such as used automotive exhaust catalysts. In the course of such pyrometallurgic recycling, the PGMs are separated by smelting the PGM-containing waste material, for example ceramic supports having a PGM-containing washcoat (such as used automotive exhaust catalysts) together with a collector metal, for example iron in an oven, a so-called smelter. The PGMs form a PGM collector alloy with the collector metal, which is separated from slag formed as by-product during smelting.

The PGM collector alloy provided in step (1) comprises 30 to 95 wt. % of iron and 2 to 15 wt. % of one or more PGMs selected from the group consisting of platinum, palladium and rhodium. In one embodiment the PGM collector alloy may comprise 40 to 70 wt. % of iron, 0 to 20 wt. % of nickel and 5 to 15 wt. % of one or more of the PGMs. It is preferred that the PGM collector alloy comprise no more than 4 wt. %, in particular ≤1 wt. % of copper. Examples of other elements (elements other than iron, nickel, copper, platinum, palladium and rhodium) which may be comprised by the PGM collector alloy include silver, gold, aluminum, calcium, silicon, phosphorus, titanium, chromium, manganese, molybdenum and vanadium. The PGM collector alloy may comprise one or more of the other elements in a total proportion of up to 30 wt. %. Hence, the PGM collector alloy may comprise or consist of:

30 to 95 wt. %, in particular 40 to 70 wt. %, of iron;
0 to 20 wt. %, in particular 0 to 15 wt. %, of nickel;
2 to 15 wt. %, in particular 5 to 15 wt. %, of one or more PGMs selected from the group consisting of platinum, palladium and rhodium;
0 to 4 wt. %, in particular 0 to 1 wt. %, of copper; and
0 to 30 wt. %, in particular 0 to 20 wt. %, of one or more other elements, in particular one or more other elements selected from the group consisting of silver, gold, aluminum, calcium, silicon, phosphorus, titanium, chromium, manganese, molybdenum, and vanadium.

In another embodiment, the PGM collector alloy comprises or consists of 40 to 70 wt. % of iron, 0 to 15 wt. % of nickel, 5 to 15 wt. % of one or more PGMs selected from the group consisting of platinum, palladium and rhodium, 0 to 1 wt. % copper, 0 to 20 wt. % of one or more other elements, in particular one or more other elements selected from the group consisting of silver, gold, aluminum, calcium, silicon, phosphorus, titanium, chromium, manganese, molybdenum and vanadium.

In step (2) of the process of the invention a copper- and sulfur-free material capable of forming a slag-type composition when molten (hereinafter also called "material capable of forming a slag-type composition when molten" for short) is provided.

The term "copper- and sulfur-free" used herein in the context of step (2) of the process of the invention means that the material capable of forming a slag-type composition when molten may comprise copper in a proportion of no more than a technically inevitable impurity level of, for example, less than 1000 wt.-ppm, and sulfur in a proportion of no more than a technically inevitable impurity level of, for example, less than 1000 wt.-ppm.

The term "material capable of forming a slag-type composition when molten" used here-in shall illustrate that the molten material looks and behaves like a slag. It shall at the same time express that it is not to be confused with the slag formed as by-product of the process of the invention, i.e. the slag obtained after conclusion of step (4). Moreover, the material capable of forming a slag-type composition when molten is not necessarily identical in composition with the one or more upper low-density molten masses formed in step (3), although it forms at least a predominant part of the latter.

The material capable of forming a slag-type composition when molten has a composition such that the molten slag-type composition itself comprises or consists of:

10 to 30 wt. %, in particular 15 to 25 wt. %, even more particular 20 to 25 wt. %, of magnesium oxide and/or calcium oxide, 70 to 90 wt. %, in particular 75 to 85 wt. %, even more particular 75 to 80 of silicon dioxide;
0 to 20 wt. %, in particular 0 wt. %, of iron oxide (in particular FeO);
0 to 20 wt. %, in particular 0 to 10 wt. %, of sodium oxide;
0 to 20 wt. %, in particular 0 to 10 wt. %, of boron oxide; and
0 to 2 wt. %, in particular 0 wt. %, of aluminum oxide.

In one embodiment, the material capable of forming a slag-type composition when molten has a composition such that the molten slag-type composition itself comprises or consists of 20 to 25 wt. % of magnesium oxide and/or calcium oxide, 75 to 80 wt. % of silicon dioxide, 0 wt. % of iron oxide, 0 to 10 wt. % of sodium oxide, 0 to 10 wt. % of boron oxide, and 0 wt. % of aluminum oxide.

The material capable of forming a slag-type composition when molten and, as a consequence thereof, also the molten slag-type composition itself does not comprise PGMs with the exception of technically inevitable impurities. However, if the latter is present, its proportion should be low; preferably such proportion does not exceed, for example, 10 wt.-ppm in the material capable of forming a slag-type composition when molten.

The material capable of forming a slag-type composition when molten is itself a combination of substances and may comprise the afore-mentioned oxides or only the oxides. However, this is not necessarily the case. It may instead or additionally comprise compounds capable of forming such oxides or oxide compositions when heated during formation of the one or more upper low-density molten masses. To name just a few examples of such type of compounds: carbonates are examples of compounds which may split off carbon dioxide and form the corresponding oxides when heated and melted during formation of the one or more upper low-density molten masses; silicates are examples of compounds which may form the corresponding oxides and silicon dioxide when heated and melted during formation of the one or more upper low-density molten masses; borates are examples of compounds which may form the corresponding oxides and boron oxide when heated and melted during formation of the one or more upper low-density molten masses.

In step (3) of the process of the invention the PGM collector alloy and the material capable of forming a slag-type composition when molten are melted in a weight ratio of 1:0.75 to 5, preferably 1:0.75 to 3, even more preferably 1:1 to 3 within a converter until a multi-phase system of a lower high-density molten mass comprising the molten PGM collector alloy and two or more upper low-density molten masses jointly comprising the molten slag-type composition has formed or, in another embodiment, until a two-phase system of a lower high-density molten mass comprising the molten PGM collector alloy and an upper low-density molten mass comprising the molten slag-type composition has formed.

The converter is a conventional pyrometallurgical converter vessel or crucible furnace which allows for melting the PGM collector alloy and the material capable of forming a slag-type composition when molten. The converter has one or more openings at its top and it may have a cylinder- or pear-shape, for example. Its construction may be such that it allows for a rotating and/or rocking movement to allow support of mixing of its contents. Preferably, it is tiltable to allow for pouring out molten content, thus enabling performing step (5) of the process of the invention. Its inner surface, which has contact with the multi- or two-phase system of the lower high-density molten mass and the one or more upper low-density molten masses, is made of a heat-resistant material as is conventional for pyrometallurgical converter vessels, i.e. a material which withstands the high temperatures prevailing in process steps (3) and (4) and which is essentially inert towards the components of the multi- or two-phase system. Examples of useful heat-resistant materials include silica bricks, fireclay bricks, chrome-corundum bricks, zircon mullite bricks, zircon silicate bricks, magnesia bricks, and calcium aluminate bricks.

In the course of step (3), first of all, the PGM collector alloy and the material capable of forming a slag-type composition when molten are introduced into the converter, either as premix or as separate components. The process according to an embodiment of the invention is a batch process. It is preferred not to introduce the entire batch all at once and then to heat and melt the contents of the converter, but to introduce the materials to be melted portion-wise and adapted to the melting speed. Once the entire batch has melted, the multi- or two-phase system of a lower high-density molten mass and the one or more upper low-density molten masses is obtained.

Heating of the converter contents in order to melt the latter and thus form the multi- or two-phase system means raising the temperature of the converter contents to, for example, 1200 to 1850° C., preferably 1500 to 1800° C. Such heating may be performed by various means either alone or in combination, for example plasma heating, indirect electrical heating, arc heating, inductive heating, indirect heating with burners, direct heating with one or more gas burners from the above, and any combination of the heating methods. Direct heating with gas burners capable of producing high temperatures in a range of 1200 to 1850° C. is a preferred method. Examples of useful gas burners include gas burners run with hydrogen or a hydrocarbon-based fuel gas and oxygen or nitrous oxide as oxidant.

After conclusion of step (3), i.e. once the multi- or two-phase system has formed, step (4) of the process of the invention is performed. In step (4) an oxidizing gas comprising or consisting of 0 to 80 vol. % of inert gas and 20 to 100 vol. % of oxygen, preferably 0 to 50 vol. % of inert gas and 50 to 100 vol. % of oxygen, in particular 0 vol. % inert gas and 100 vol. % of oxygen (i.e., oxygen gas) is contacted with the lower high-density molten mass obtained in step (3) until the latter has been converted into a lower high-density molten mass of the PGM-enriched alloy, i.e. the PGM-enriched alloy has formed. Any gas inert towards the lower high-density molten mass can be taken as the inert gas, in particular argon and/or nitrogen.

In preferred embodiments, contact between the oxygen or oxygen containing oxidizing gas and the lower high-density molten mass can be made by passing or bubbling the gas through the lower high-density molten mass from the bottom of the converter and/or by a gas lance whose exhaust is immersed into the lower high-density molten mass. The duration of the contact with the oxidizing gas or, in other words, the amount of oxidizing gas employed depends on when the PGM-enriched alloy of the desired composition has formed. In still other words, the contact with the oxidizing gas is maintained for such period of time, until a PGM-enriched alloy with a desired composition according to any of the afore-disclosed embodiments has formed; this will typically take 1 to 5 hours or 2 to 4 hours, for example. The development of the composition of the lower high-density molten mass, during performance of step (4) until the PGM-enriched alloy of the desired composition has formed, can be tracked by standard analytical techniques, for example XRF (X-ray fluorescence) analysis. As a by-product, an upper low-density molten slag is formed in the course of step (4).

The contact with the oxidizing gas leads to an exothermic oxidation reaction in the course of which nonprecious elements or metals are converted into oxides and absorbed by the one or more upper low-density molten masses. The oxidation process of step (4) results in depletion of elements or metals other than the PGMs, in particular in depletion of iron and, if present, other non-precious elements or metals within the lower high-density molten mass or, if taking the reverse view, in PGM enrichment within the lower high-density molten mass.

After conclusion of step (4), i.e. once the PGM-enriched alloy of the desired composition has formed, step (5) of the process of the invention is performed. In the step (5) the upper low-density molten slag formed in step (4) is separated from the lower high-density molten mass of the PGM-enriched alloy by making use of the difference in density. To this end, the content of the converter is carefully poured out making use of the well-known decantation principle. Once the upper low-density molten slag is decanted, the lower high-density molten mass of the PGM-enriched alloy is poured into suitable containers.

Steps (3) to (5) of the process of the invention constitute a sequence of steps, in particular in direct succession. This needs to be understood in such sense that no further steps or at least no further fundamental steps are required or performed between or during the steps (3) to (5). Examples of optional non-fundamental steps are (i) the removal of part of upper low-density molten mass in the course of step (4) or (ii) addition of PGM collector alloy and/or material capable of forming a slag-type composition when molten in the course of step (4).

After conclusion of step (5) subsequent step (6) is performed, in which the separated molten masses are allowed to cool down and solidify.

After solidification the solidified PGM-enriched alloy is collected in step (7). It may then be subject to further conventional refinement, for example electrometallurgical and/or hydrometallurgical refinement, in order to finally obtain the individual PGMs either as metal or as PGM compound or as a solution of the latter.

It is an advantage of the process of the invention that the PGM-enriched alloy collected in step (7) is distinguished by a relatively high PGM content. This relatively high PGM content means less effort and less consumption of chemicals with a view to the further refinement processes.

It is a further remarkable advantage of the process of the invention that the slag formed as by-product during step (4) comprises a very low PGM content of less than 50 wt.-ppm. It is not finally understood why, but it is believed that the 1:0.75 to 5 or 1:1 to 3 weight ratio combination of the specifically composed PGM collector alloy provided in step (1) and the specifically composed material capable of forming a slag-type composition when molten provided in step (2) is key in particular with regard to the remarkably low loss of PGMs into the slag formed as by-product during step (4) of the process of the invention.

EXAMPLES

Example 1

A premix of 500 kg of a sulfur-free PGM collector alloy comprising 49 wt. % of iron, 13.1 wt. % of nickel, 8.1 wt. % of silicon, 4.6 wt. % of palladium, 3.2 wt. % of chromium, 2.5 wt. % of titanium, 2.2 wt. % of platinum, 1.3 wt. % of manganese, 0.6 wt. % of rhodium and 0.4 wt. % of copper, 120 kg of calcium oxide, 450 kg of silicon dioxide, 15 kg of sodium carbonate, and 15 kg of borax was introduced portion-wise into an already 1500° C. hot cylindrical natural gas-heated furnace and further heated to 1700° C. After a melting time of 10 hours a two-phase system of a lower high-density molten mass comprising the PGM collector alloy and an upper low-density molten mass comprising a slag-type composition was formed.

Oxygen was introduced into the lower high-density molten mass via a ceramic pipe with an oxygen flow of 900 l/min. After 2.5 hours the oxygen introduction was stopped. The upper low-density molten mass was poured into cast iron slag pots in order to cool down and solidify. The lower high-density molten mass was then poured into graphite molds in order to cool down and solidify. After solidification and cooling down to ambient temperature both materials were analyzed by XRF.

Examples 2 and 3

Example 1 was repeated with the difference that the oxygen introduction took 2.75 hours (Example 2) or 3 hours (Example 3).

The results of the XRF analyses are compiled in Tables 1 and 2. All values are in wt. %, except the values for the PGM content in the slag which are in wt.-ppm:

TABLE 1

Composition of the solidified lower high-density mass (PGM enriched alloy)

| Element | Example 1 | Example 2 | Example 3 |
| --- | --- | --- | --- |
| Fe | 19 | 12 | 12 |
| Ni | 52 | 55 | 49 |
| Cu | 2 | 2 | 2 |
| Pt | 9 | 11 | 10 |
| Pd | 16 | 17 | 24 |
| Rh | 2 | 3 | 3 |

TABLE 2

Composition of the solidified upper low-density mass (slag)

| Element | Example 1 | Example 2 | Example 3 |
| --- | --- | --- | --- |
| PGM | 48 | 49 | 40 |
| Fe | 28 | 30 | 33 |
| Ni | 1 | 1 | 2 |

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A process for production of a platinum group metal (PGM)-enriched alloy comprising 0 to 60 wt. % of iron and 20 to 99 wt. % of at least one PGM selected from the group consisting of platinum, palladium and rhodium, the process comprising steps of:
   (1) providing a sulfur-free PGM collector alloy comprising 30 to 95 wt. % of iron and 2 to 15 wt. % of the at least one PGM;
   (2) providing a copper- and sulfur-free material capable of forming a slag-type composition when molten, wherein the molten slag-type composition comprises 10 to 30 wt. % of magnesium oxide and/or calcium oxide and 70 to 90 wt. % of silicon dioxide;
   (3) melting the PGM collector alloy and the material capable of forming a slag-type composition when molten in a weight ratio of 1:0.75 to 5 within a converter until a multi-phase system of a lower high-density molten mass comprising the molten PGM collector alloy and at least one upper low-density molten mass comprising the molten slag-type composition has formed;
   (4) contacting an oxidizing gas comprising 0 to 80 vol. % of inert gas and 20 to 100 vol. % of oxygen with the lower high-density molten mass obtained in step (3) until it has been converted into a lower high-density molten mass of the PGM-enriched alloy;
   (5) separating an upper low-density molten slag mass formed during step (4) from the lower high-density molten mass of the PGM-enriched alloy by difference in density;
   (6) allowing the molten masses separated from one another in step (5) to cool down and solidify; and
   (7) collecting the solidified PGM-enriched alloy.

2. The process of claim 1, wherein the PGM-enriched alloy comprises:
   0 to 45 wt. % of iron,
   30 to 99 wt. % of the at least one PGM,
   0 to 60 wt. % of nickel,
   0 to 5 wt. % of copper, and
   0 to 10 wt. % at least one other element.

3. The process of claim 2, wherein the at least one other element is selected from the group consisting of silver, gold, aluminum, calcium, and silicon.

4. The process of claim 1, wherein the PGM-enriched alloy comprises:
   0 to 20 wt. % of iron,
   40 to 90 wt. % of the at least one PGM,
   0 to 60 wt. % of nickel,
   0 to 5 wt. % of copper, and
   0 to 3 wt. % of at least one other element.

5. The process of claim 4, wherein the at least one other element is selected from the group consisting of silver, gold, aluminum, calcium, and silicon.

6. The process of claim 1, wherein the PGM collector alloy provided in step (1) comprises 40 to 70 wt. % of iron, 0 to 20 wt. % of nickel, and 5 to 15 wt. % of the at least one PGM.

7. The process of claim 1, wherein the PGM collector alloy comprises no more than 4 wt. % of copper.

8. The process of claim 1, wherein the PGM collector alloy comprises:
   30 to 95 wt. % of iron,
   0 to 20 wt. % of nickel,
   2 to 15 wt. % of the at least one PGM,
   0 to 4 wt. % of copper, and
   0 to 30 wt. % at least one other element.

9. The process of claim 8, wherein the at least one other element is selected from the group consisting of silver, gold, aluminum, calcium, silicon, phosphorus, titanium, chromium, manganese, molybdenum, and vanadium.

10. The process of claim 9, wherein the PGM collector alloy comprises:
    40 to 70 wt. % of iron,
    0 to 15 wt. % of nickel,
    5 to 15 wt. % of the at least one PGM
    0 to 1 wt. % copper, and
    0 to 20 wt. % of the at least one other element.

11. The process of claim 10, wherein the at least one other element is selected from the group consisting of silver, gold, aluminum, calcium, silicon, phosphorus, titanium, chromium, manganese, molybdenum, and vanadium.

12. The process of claim 1, wherein the molten slag-type composition comprises:
   10 to 30 wt. % of magnesium oxide and/or calcium oxide,
   70 to 90 wt. % of silicon dioxide,
   0 to 20 wt. % of iron oxide,
   0 to 20 wt. % of sodium oxide,
   0 to 20 wt. % of boron oxide, and
   0 to 2 wt. % of aluminum oxide.

13. The process of claim 1, wherein the molten slag-type composition comprises:
   20 to 25 wt. % of magnesium oxide and/or calcium oxide,
   75 to 80 wt. % of silicon dioxide,
   0 wt. % of iron oxide,
   0 to 10 wt. % of sodium oxide,
   0 to 10 wt. % of boron oxide, and
   0 wt. % of aluminum oxide.

14. The process of claim 1, wherein the PGM collector alloy and the material capable of forming a slag-type composition when molten are melted in a weight ratio of 1:0.75 to 3.

15. The process of claim 1, wherein the converter is heated to raise its contents to a temperature of 1200 to 1850 ° C.

16. The process of claim 1, wherein the oxidizing gas is oxygen.

17. The process of claim 1, wherein the contact between the oxidizing gas and the lower high-density molten mass is made by passing or bubbling the gas through the lower high-density molten mass from the bottom of the converter and/or by a gas lance whose exhaust is immersed into the lower high-density molten mass.

18. The process of claim 1, wherein the contacting with the oxidizing gas takes 1 to 5 hours.

* * * * *